Jan. 18, 1927.

H. M. PFLAGER 1,614,932

CAR TRUCK

Filed Oct. 13, 1923    2 Sheets-Sheet 1

Inventor
Harry M. Pflager

By Cornwall, Bedell & James
Attorneys

Jan. 18, 1927.
H. M. PFLAGER
1,614,932
CAR TRUCK
Filed Oct. 13, 1923    2 Sheets-Sheet 2
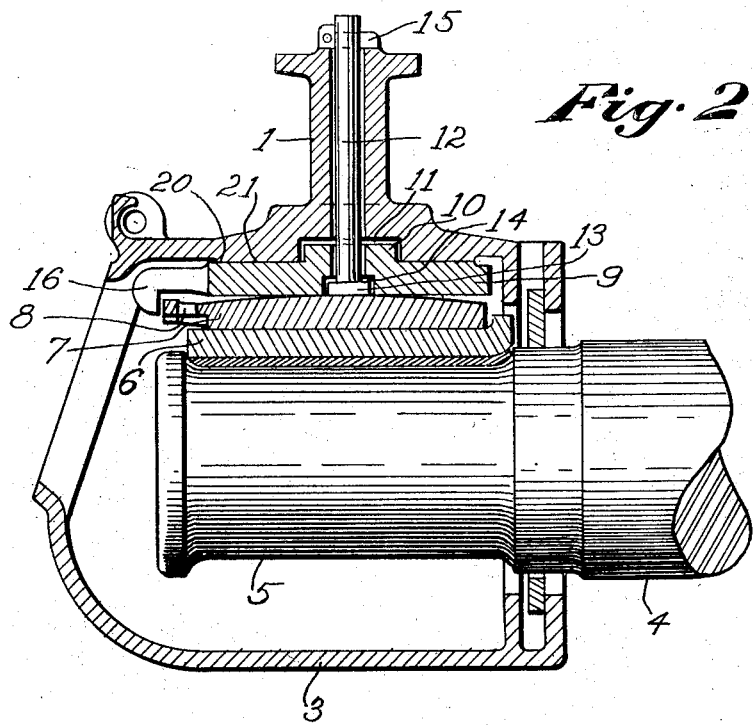
Fig. 2.
Fig. 3.
Inventor
Harry M. Pflager
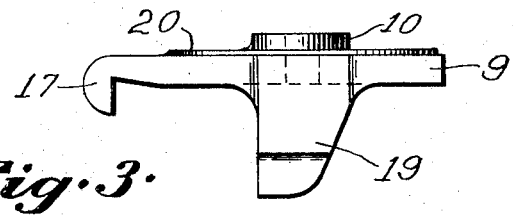
Attorneys Patented Jan. 18, 1927.

1,614,932

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK.

Application filed October 13, 1923. Serial No. 668,377.

This invention relates to a new and useful improvement in car truck construction and particularly to the types disclosed in United States Letters Patent No. 995,560, dated June 20, 1911 and Reissue Letters Patent No. 14,221, dated November 28, 1916, the original of which Letters Patent No. 1,147,430, was granted to me on July 20, 1915, and Letters Patent No. 1,358,016, dated November 9, 1920.

This invention, as in those above mentioned, contemplates the use of car trucks adapted to carry rigid cars and to support the cars at two points on each truck. In this type of truck it is necessary that the axles have certain lateral movement relative to the normal position of the car body so that curves may be negotiated. It has previously been the practice to pivotally connect the journal box to the side frame to permit such lateral motion.

The object of my invention is to provide a journal box cast integrally with the side frame and a journal box pivot plate which will permit the necessary lateral motion and hold the bearing properly centered at all times.

With the foregoing and other objects in view, my invention consists in certain novel features of construction and arrangement of parts, hereinafter more fully described and claimed, and illustrated in the accompanying drawings, in which—

Figure 2 is a cross section taken on the lines 2—2 of Figure 1.

Figure 3 is a side elevation of the journal box pivot plate.

Figure 1:
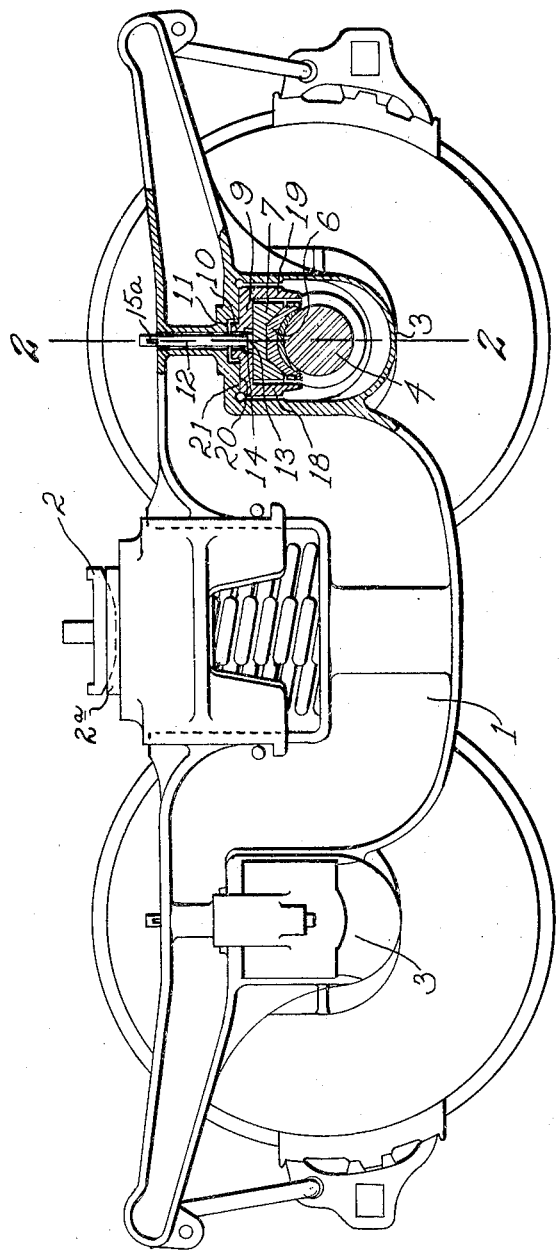
Figure 1 is a side elevational view of a car truck of my improved construction.

The numeral 1 in the drawings indicates the side frame of a car truck. 2 is a pivot plate fixed on body bolster of the car (not shown) and which rotatably connects with the top bearing plate 2ª of truck contained in side frame 1. 3 are journal boxes cast integrally with side frame 1.

4 is an axle having the customary bearing surface 5. The journal bearing 6 rests on bearing surface 5 of axle 4 and is also of usual construction. 7 is a bearing wedge having an opening 8 in its outer end into which a hook or some similar means (not shown) may be introduced to remove said bearing wedge. 9 is a journal box pivot plate having a boss 10 on its top portion fitting in a corresponding recess 11 in the side frame 1. This journal box pivot plate 9 is held in place by a vertically disposed pin 12 which passes upwardly through side frame 1. The head 13 of pin 12 fits in a recess 14 on the underside of journal box pivot plate 9. Recess 14 is directly under and in line with boss 10. The upper end of pin 12 may be threaded for a nut or the pin may be held in place by a key passed through the side frame. However, I prefer the construction shown in Figure 2, in which a key 15 fits through opening 15ª in pin 12 and rests on top of side frame 1 in such a manner as to hold pin 12 in proper position.

The end of the journal box pivot plate 9 extending toward the end of axle 4 is bifurcated and bent downwardly forming hook-like members 16 and 17 which bear against the outer edge of the bearing wedge 7 thereby locking it in place against longitudinal movement relative to the axle 4. It will be noted that the opening 8 in the bearing wedge 7 is immediately between the bifurcated ends 16 and 17 of pivot plate 9 so that bearing wedge 7 is locked in, yet its removal may be effected by raising the journal box slightly and inserting a hooked rod into the opening 8 of the bearing wedge to remove it.

Depending from either side of the pivot plate 9 are tongues 18 and 19 which fit over the sides of bearing wedge 7 and hold it against lateral movement relative to axle 4 and also against rotation with the bearing surface 5 of the axle 4. 20 is a friction surface surrounding boss 10 on the top surface of the journal box pivot plate 9. This friction surface 20 rests against a corresponding surface 21 on the underside of side frame 1 within the journal box 3.

In this type of car truck, when rounding a curve to the left, for example, the forward axle would move to the left and the rear axle would move to the right an equal distance, maintaining the longitudinal centers of the axle parallel at all times. The journal box pivot plate 9 would pivot the necessary distance, at the same time holding the bearing wedge 7 and the bearing 6 in proper alignment with the axle 4. The journal box 3 would remain stationary in relation to the side frame 1.

It can be readily seen that to cast the journal boxes integral with the side frame in this type truck, as in any other, strengthens it, lessens the cost of manufacture, and simplifies the structure.

I claim:

1. A car truck including a side frame, a pivotal connection between said side frame and the car body, a journal box being a part of said side frame, an axle, a journal bearing, a bearing wedge, and a journal box plate pivotally connected to said side frame, said plate separating said bearing wedge from said journal box and acting as a friction member therebetween.

2. In a truck, a side frame, a journal box cast integrally therewith, an axle, a bearing member resting on said axle, a bearing wedge resting on and locking said bearing in position, and a plate pivotally connected to said side frame and locking said bearing wedge in position.

3. In a truck, a side frame, a journal box, and a removable journal bearing element secured directly to said side frame.

4. A truck comprising a side frame, a journal box, an axle, a bearing, a bearing wedge, and means fixed to said side frame for locking in said bearing wedge.

5. A truck comprising a side frame, a journal box, an axle, a bearing, and a bearing wedge, and a removable pivotal locking element fixed between said bearing wedge and said side frame.

6. In a truck including a side frame, a journal box, a bearing wedge a plate within said journal box connected to said side frame, and tongues depending from the body of said plate to lock said bearing wedge in position.

7. In a truck including a side frame, a journal box, a bearing wedge, and a plate within said journal box connected to said side frame and locking said bearing wedge in position.

8. In a truck including a side frame and a journal box, a removable journal bearing element secured through the top of the box to said side frame.

9. In a truck including a side frame and a journal box, a plate member within said box adapted for pivotal movement therein, means locking said plate against horizontal displacement and a removable connection to said side frame to prevent vertical displacement.

10. In a truck, a side frame, a journal box, a journal bearing element, and a holding member for said element secured directly to said side frame.

11. In a truck, a side frame, a journal box, the bottom of said frame over said box being formed integrally with the top of the latter, and a journal bearing within the box pivotally engaging the bottom of said frame.

12. In a truck, a journal box, a side frame extending over said box, and a journal bearing element in said box having pivotal contact with said frame.

In testimony whereof I hereunto affix my signature this 4th day of October, 1923.

H. M. PFLAGER.